A. J. MICHELIN.
PNEUMATIC TIRE COVER.
APPLICATION FILED NOV. 16, 1910.
997,687.
Patented July 11, 1911.
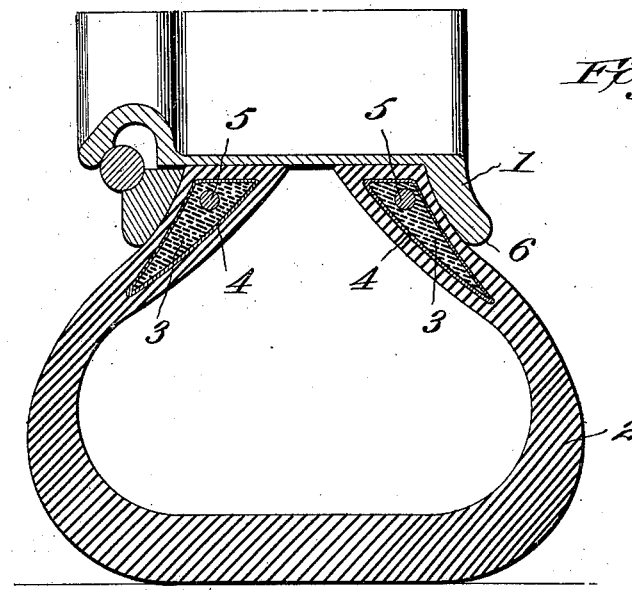
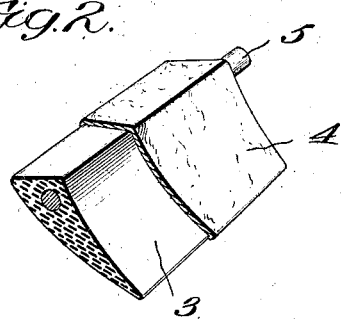
Witnesses
Byron B. Collings.
Geo. A. Bruce.
Inventor
Andre J. Michelin.
By Wilkinson, Fisher & Witherspoon
Attorneys.

UNITED STATES PATENT OFFICE.

ANDRÉ J. MICHELIN, OF PARIS, FRANCE.

PNEUMATIC-TIRE COVER.

997,687.

Specification of Letters Patent. Patented July 11, 1911.

Application filed November 16, 1910. Serial No. 592,690.

*To all whom it may concern:*

Be it known that I, ANDRÉ JULES MICHELIN, a citizen of the Republic of France, residing at Paris, France, have invented certain new and useful Improvements in Pneumatic-Tire Covers; and I do hereby declare the following to be a full, clear, and exact description of the invention, such as will enable others skilled in the art to which it appertains to make and use the same.

My invention relates to improvements in pneumatic tire covers, and the object of my invention is to produce a simple cover whereby the wear of the cover against the edges of the rim will be largely prevented.

With this object in view, my invention consists in the construction and combinations of parts as hereinafter described and claimed.

In the accompanying drawings, Figure 1 is a section of a portion of a rim and a cover applied thereto, showing my invention; and Fig. 2 is a perspective view of the stiff material embedded near the extremities of the cover.

Referring to Fig. 1, 1 represents the rim and 2 the tire cover. This cover has the fabric along its edges inclosing reinforcing elements in the usual manner. These elements, as shown in Fig. 2, consist each of a core or bead comprising a fabric covering or sleeve 4, preferably canvas; and a felt or granular packing 3, preferably composed of india rubber and a ground textile material, the whole being elongated or of substantially wedge shape in cross section, and having a reinforcing strand 5 embedded therein adjacent the base of the core. As shown in Figs. 1 and 2, these beads have a flat base nearest the rim, and the sides of the beads are inclined thereto, the outer on a slight concave curve and the inner side in a slightly greater convex curve. These beads are made of such a size that their pointed ends project into the cover 2 to a point outside the inner point 6 of the rim. The result of this construction is that the wear which occurs ordinarily on the inner edges of the flanges of the rim where it contacts with the cover is very materially reduced, as shown by actual trial.

What I claim is—

1. A tire cover for wheels with flanged rims, having embedded in said cover beads of relatively stiff but slightly flexible material; said beads comprising each a cover having a packing of resilient and textile material; and a reinforcing strand in said packing, said beads being elongated and tapering in cross-section and adapted to overlie the outer flange edges, as set forth.

2. A tire cover for wheels with flanged rims, having embedded in said cover beads of relatively stiff but slightly flexible material; said beads comprising each a cover having a packing of india rubber and granular textile material; and a reinforcing strand in said packing; said beads being elongated and tapering in cross-section and adapted to overlie the outer flange edges, as set forth.

In testimony whereof, I affix my signature, in presence of two witnesses.

ANDRÉ J. MICHELIN.

Witnesses:
H. C. COXE,
JOHN BAKER.